United States Patent

Best

Patent Number: 6,047,697
Date of Patent: Apr. 11, 2000

[54] SOLAR COLLECTOR

[75] Inventor: Frederick George Best, Bucks, United Kingdom

[73] Assignee: Energy International Systems Limited, United Kingdom

[21] Appl. No.: 08/765,715

[22] PCT Filed: Jul. 5, 1995

[86] PCT No.: PCT/GB95/01584

§ 371 Date: Feb. 28, 1997

§ 102(e) Date: Feb. 28, 1997

[87] PCT Pub. No.: WO96/01400

PCT Pub. Date: Jan. 18, 1996

[30] Foreign Application Priority Data

Jul. 5, 1994 [GB] United Kingdom .................... 9413496

[51] Int. Cl.[7] .................... F24J 3/32; F24J 2/10; F24J 2/12; F24J 2/50

[52] U.S. Cl. .................... 126/635; 126/684; 126/692; 126/694; 126/698; 126/704; 126/705; 126/707; 126/711; 165/104.26

[58] Field of Search .................... 126/635, 636, 126/698, 692, 694, 704, 707, 710, 711, 712, 713, 705, 706, 708, 684, 657, 652; 165/104.21, 104.26

[56] References Cited

U.S. PATENT DOCUMENTS

| | | | |
|---|---|---|---|
| 1,683,266 | 9/1928 | Shipman | 126/698 |
| 3,537,514 | 11/1970 | Leveldahl . | |
| 4,067,315 | 1/1978 | Fehlner et al. . | |
| 4,088,118 | 5/1978 | Benseman | 126/635 |
| 4,140,103 | 2/1979 | Leigh | 126/666 |
| 4,198,955 | 4/1980 | Dorbeck . | |
| 4,299,201 | 11/1981 | Tsubota . | |
| 4,311,131 | 1/1982 | Sabet . | |
| 4,566,433 | 1/1986 | Amundsen . | |
| 5,453,641 | 9/1995 | Mundinger et al. . | |

FOREIGN PATENT DOCUMENTS

| | | | |
|---|---|---|---|
| 537408 | 1/1980 | Australia . | |
| 536634 | 2/1980 | Australia . | |
| 0 033 174 | 8/1981 | European Pat. Off. . | |
| 0055478 | 7/1982 | European Pat. Off. . | |
| 4007839 | 9/1991 | Germany . | |
| 352055033 | 2/1977 | Japan | 126/635 |
| 2013870 | 8/1979 | United Kingdom . | |
| 2023804 | 1/1980 | United Kingdom . | |
| 2030283 | 4/1980 | United Kingdom . | |
| 2103350 | 2/1983 | United Kingdom . | |
| 2113201 | 8/1983 | United Kingdom . | |
| 2147408 | 5/1985 | United Kingdom . | |

*Primary Examiner*—Carl D. Price
*Attorney, Agent, or Firm*—Jones & Askew

[57] ABSTRACT

A solar collector comprising an evacuation envelope; an absorber housed inside the evacuated envelope and comprising plates which define an evaporation gap, the evaporation gap providing communication between a reservoir of heat transfer fluid at a first, bottom end of the absorber and a condenser at a second, top end of the absorber. The plates define the evaporation gap so that capillary action between the plates can draw heat transfer fluid from the reservoir along at least a substantial portion of the evaporation gap to the condensor. The absorber transfers heat derived from the incident solar radiation to heat transfer fluid contained in the evaporation gap.

19 Claims, 5 Drawing Sheets

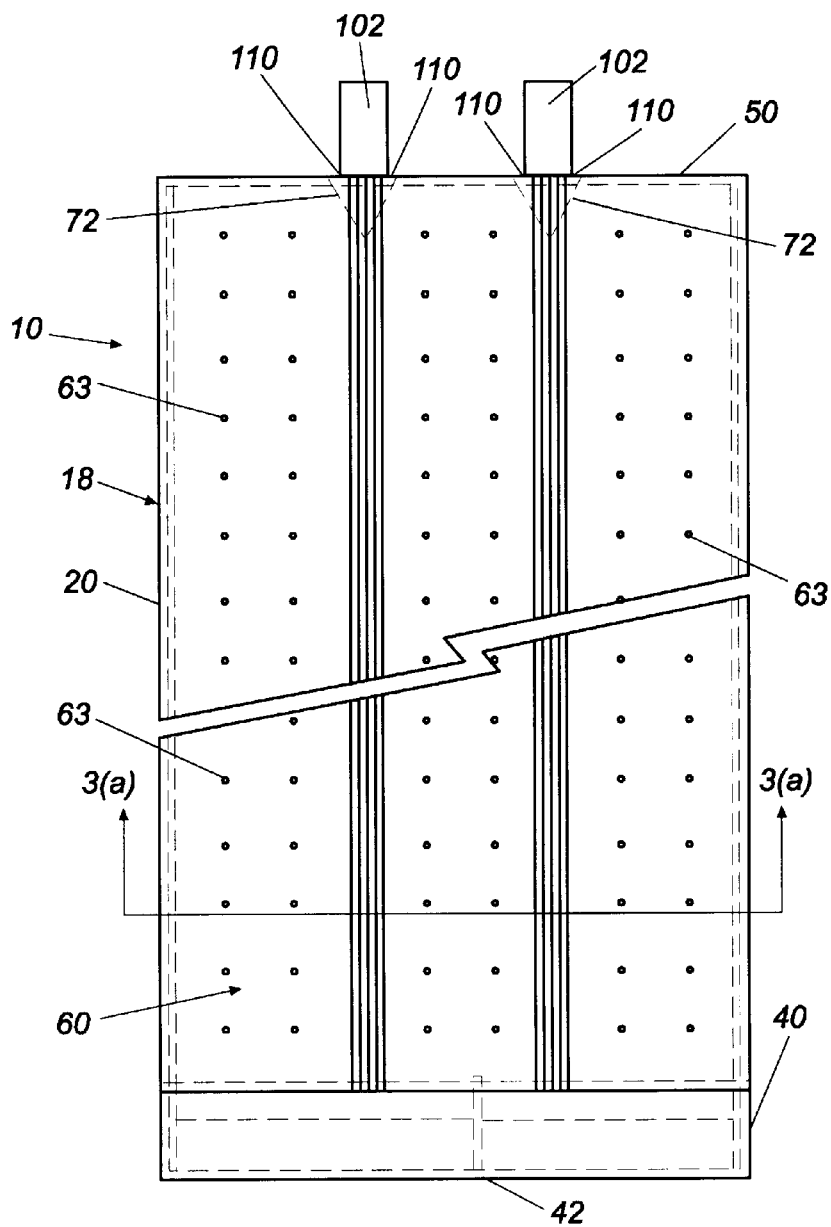
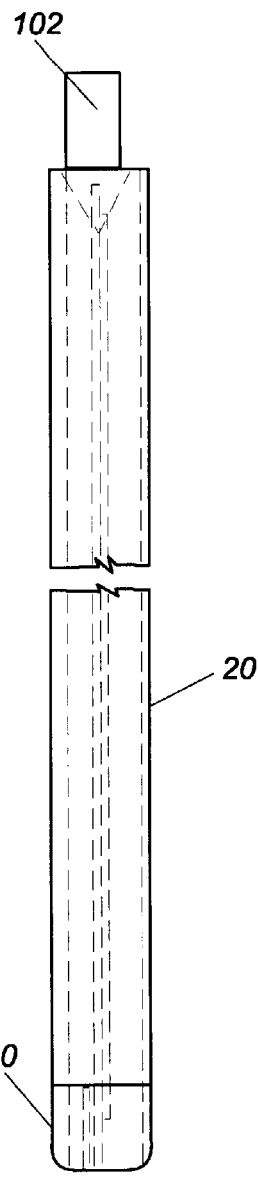
Fig. 1
Fig. 2

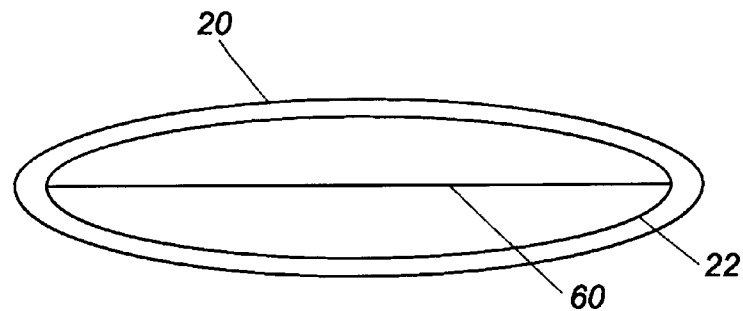
Fig. 6
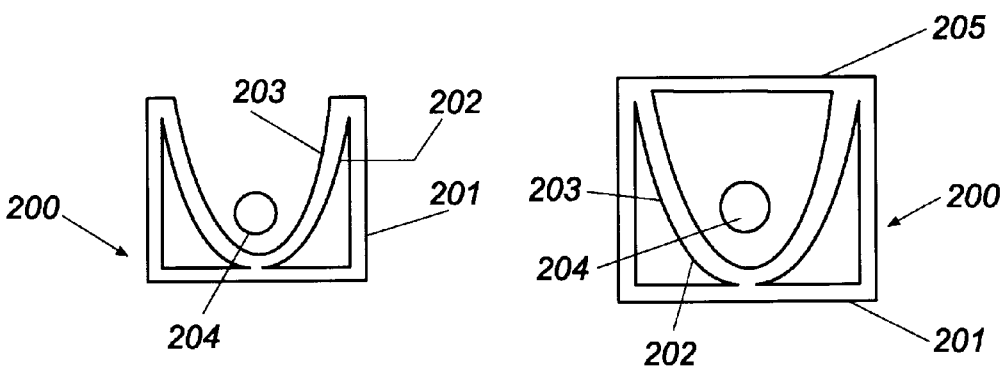
Fig. 7a  Fig. 7b
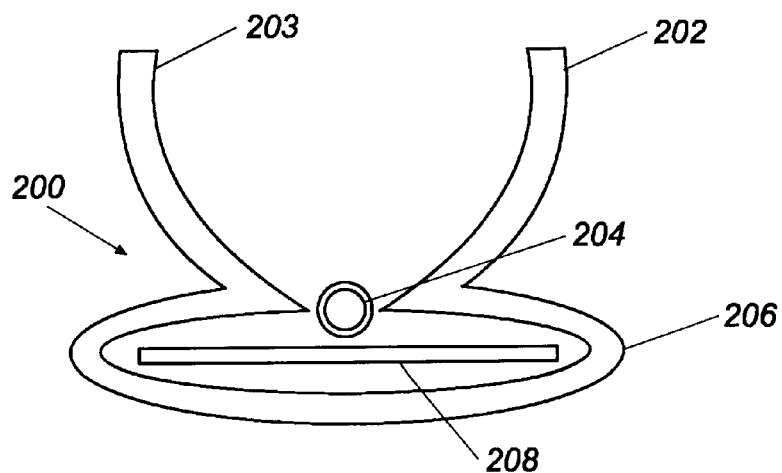
Fig. 8

SOLAR COLLECTOR

FIELD OF THE INVENTION

The present invention relates to a solar collector and particularly to a solar collector of the sort which operates by collecting and distributing heat by means of vaporisation and condensation of a heat transfer fluid.

In the art, such solar collectors are also called heat tubes or pipes.

BACKGROUND OF THE INVENTION

Typical prior art solar collectors are disclosed in GB-A-2023804 and U.S. Pat. No. 4,311,131. These collectors comprise a housing within which is located an absorber. The absorber comprises a plate through which heat is transferred to the working or heat transfer fluid contained in an attached tube. AU-B-537408 describes a solar collector comprising an envelope and an absorber within the envelope, the absorber likewise comprising means by which heat is transferred to the heat transfer fluid.

BRIEF SUMMARY OF THE INVENTION

The present invention aims at providing an improved solar collector.

According to one aspect, the present invention provides a solar collector comprising: an envelope; an absorber housed inside the envelope and comprising plates which define an evaporation gap providing communication between a reservoir of heat transfer fluid at a first end of the absorber and a condenser at a second end of the absorber, the arrangement of the plates defining the evaporation gap being such that capillary action between the plates can draw heat transfer fluid from the reservoir along at least a substantial portion of the evaporation gap to the condensor; the absorber serving to transfer heat derived from incident solar radiation to heat transfer fluid contained in the evaporation gap. The envelope may advantageously be evacuated.

Throughout the specification, the term 'plate' should be construed broadly, and for the avoidance of doubt, should be understood as including membranes and the like.

By virtue of the heat transfer fluid being drawn from the reservoir into the evaporation gap by capillary action, at any given instant, a large surface area per unit mass of fluid is exposed to the incident solar radiation. In addition, even as the fluid is boiled from the liquid into the vapour phase the volume of liquid in the evaporation gap remains constant due to capillary action, thereby maintaining the favourable exposure of the liquid heat transfer fluid to the incident solar radiation.

Further, the solar collector of the present invention tackles the problem prevalent in some prior art designs of the channel containing the heat transfer fluid overheating immediately after a sunless period, as at least a substantial portion, or possibly all, of the gap is still filled by fluid even when the sun does not shine.

The plates of the absorber can also define a condensate channel providing communication between the condenser and the reservoir.

According to a further aspect, the present invention provides a solar collector comprising: an envelope; an absorber housed inside the envelope and comprising a plurality of plates which define a gap, the gap extending lengthwise, and providing fluid communication, between first and second ends of the absorber, the width of the gap being substantially greater than the spacing between the plates; the absorber serving to transfer heat derived from incident solar radiation to heat transfer fluid contained in the gap. The envelope may advantageously be evacuated.

In an alternative aspect, the invention provides a solar collector comprising:
a solar radiation concentrator;
an absorber to absorb heat derived from incident solar radiation; and
means to transfer heat energy away from the absorber; characterised in that the concentrator is preformed to optimise the concentration of incident solar radiation onto the absorber.

Preferably the concentrator is formed by moulding or extrusion. The concentrator may be formed as a single moulding or extrusion, or as a plurality of moulded or extruded pieces.

In one aspect of the invention, the concentrator comprises a tube of extruded, clear plastics material, having a reflective layer on one of its surfaces to reflect incident solar radiation back onto the absorber. In another aspect, the concentrator is formed of a reflective material and has a substantially parabolic cross-section.

It will be appreciated that a solar collector in accordance with this further aspect of the invention is advantageous in that the absorber gap is shaped to provide a more efficient transfer of the heat from the incident solar radiation to the fluid in the gap than the above referenced prior art arrangements with their channels.

BRIEF DESCRIPTION OF THE DRAWINGS

Exemplary embodiments of the invention are hereinafter described with reference to the accompanying drawings, in which:

FIG. 1 shows a first view of a solar collector in accordance with the present invention;

FIG. 2 shows a side view of FIG. 1;

FIG. 6 shows, in cross-section, a solar collector according to an alternative aspect of the invention;

FIGS. 7a & 7b show, in cross-section, a solar collector having a substantially parabolic solar radiation concentrator;

FIG. 8 shows, in cross-section, a solar collector having a concentrator formed with an upper solar radiation reflector part and a lower housing part.

DETAILED DESCRIPTION OF PREFERRED EMBODIMENTS

Figure 3A:
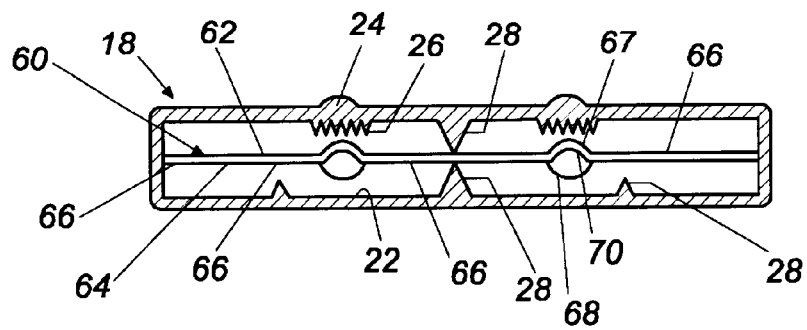
FIG. 3(a) shows a section of FIG. 1 taken along the line A—A.
Figure 3B:
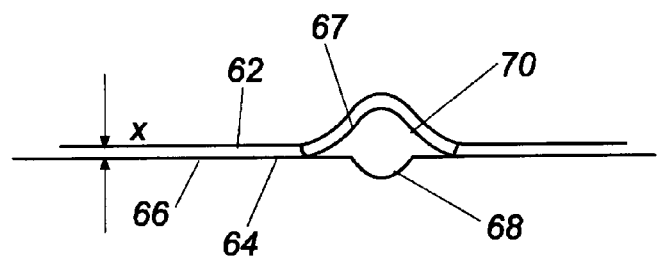
FIG. 3(b) shows a portion of FIG. 3(a) enlarged.

Referring particularly to FIGS. 1 to 3, a solar collector in accordance with the present invention is generally designated 10.

The solar collector 10 comprises an evacuated envelope 18 including a solar radiation concentrator in the form of a clear, rectangular tube 20 (which may conveniently be extruded) which is closed off at a first, bottom end by a reservoir 40 of heat transfer fluid and closed off at a second, top end by an end plate 50. The solar collector (10) also comprises an absorber (60) housed in the envelope 18, which serves to collect heat derived from incident solar radiation. The tube 20 is held in position at the first, bottom end of the absorber 60 by a suitable sealant, for example mastic-type sealant which also provides a gas-tight seal. A valved conduit 42 passes from the interior of the tube 20 through the reservoir 40 to the exterior of the envelope and serves to permit the evacuation of the envelope 18. The tube 20 also includes strengthening ribs 24, 26 and strengthening ridges 28. The end plate 50 includes apertures each of which is adapted to receive a condenser 102 and high temperature "U" seal 110 which slides over the condenser 102 and serves to accommodate for differences in thermal expansivity between the condensor 102 and the envelope 18.

The absorber 60 comprises a pair of generally parallel plates 62, 64 which are maintained in spaced relation to each other at a small distance X by a plurality of protuberances 63 formed on the upper plate 62. Referring to FIG. 3(*b*), at two regions across the plates 62, 64 the plates temporarily diverge from each other. In each region, a plate 70 runs parallel to the upper plate 62 and is spaced therefrom by a distance X. The plates 62, 64, 70 thereby define an evaporation gap 66, 67 and larger condensate channels 68. It will be appreciated that the width of the evaporation gap 66, 67 is substantially greater than the distance X. Suitable materials for the reservoir 40 and the plates 62, 64, 70 of the absorber 60 may include sheet steel, aluminium, plastic and glass, provided always that they are sufficiently strong and have adequate heat transfer properties.

In the region of the condensate channels 68, notches or cut-aways 72 are formed at the top end of the plates 62, 64, 70. The absorber 60 is an integral part of the reservoir 40 and the condenser 102 such that the working fluid is sealed inside the collector. Evacuation and filling of the absorber is effected using a valve situated in the top of the the condensor 102 so that it can be accessed from outside the completely assembled collector 10. Heat is removed from the condensor 102 by the use of a heat exchange unit 100 which slides over the condensor and is locked thereto to provide good conduction of heat. The heat exchange unit 100 may, if desired, be the evaporator of a further heat pipe arrangement by which heat may be transferred to a remote region. The plates 62,64,70 must be permanently submerged within the heat transfer fluid in the reservoir 40 to ensure that capillary action takes place.

Figure 5:
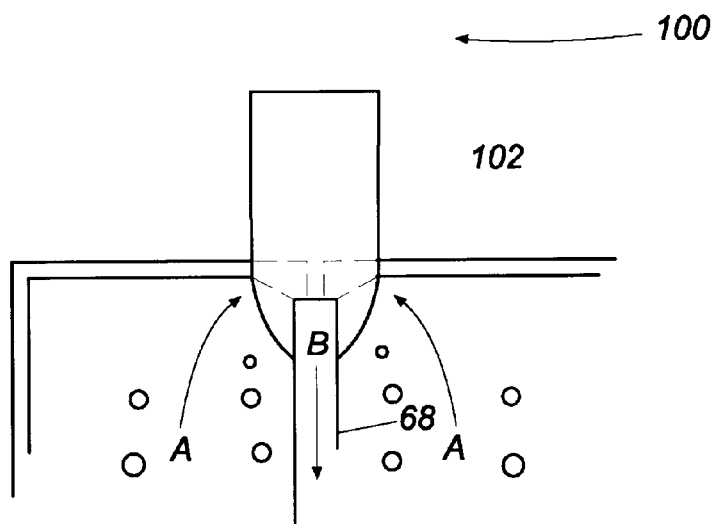
FIG. 5 shows the connection of a condensor with an absorber assembly as in FIG. 4 in more detail.
Figure 4:
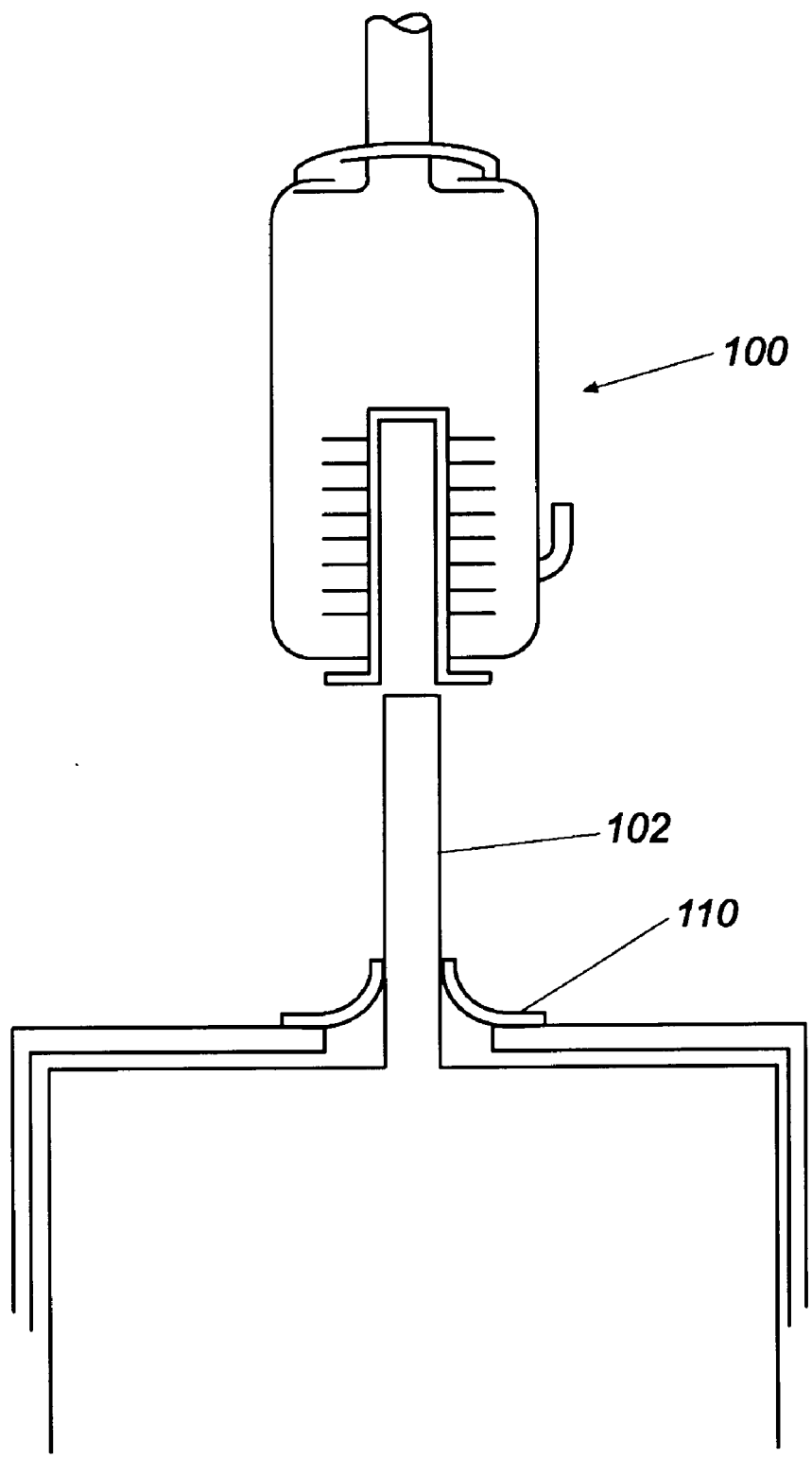
FIG. 4 shows the solar collector of FIG. 1 having a heat exchanger unit above the end of the condensor.

The connection of a condensor 102 to a notch 72 is shown in more detail in FIG. 5. The condensor 102 is adapted to permit boiled heat transfer fluid to travel along a path indicated by arrow A in FIG. 5 and permit condensed heat transfer fluid to exit the condensor 102 along a path indicated by arrow B in FIG. 5 which leads back to the reservoir 40 via the channel 68.

The tube 20 has a reflective layer 22 provided on one of its surfaces to reflect incident radiation back onto the absorber 60. Aluminum foil or a highly reflective plastic sheet can be secured to the surface of the tube 20; alternatively, a reflective layer can be provided by the electro-deposition of a suitable reflective material.

The strengthening ribs 24, 26 are shaped to serve as focusing lenses to direct solar radiation onto targeted area of the plates 62, 64 to locally increase the temperature of the heat transfer fluid and thus improve the efficiency of the collector 10. Focusssing lenses can, if desired, be positioned at any convenient regions of the tube. Indeed external focussing ribs may be positioned and shaped so as to be struck by oblique radiation (for example as the sun rises or sets) so as to focus that radiation and bring the collector into operation sooner.

Some of the strengthening ribs or the strengthening ridge 28 can be tipped with an insulating material 28*a* and contact the plates to improve the structural integrity of the collector 10, if required.

In accordance with the invention, the spacing X is selected to be sufficiently small such that capillary action between the plates can draw heat transfer fluid from the reservoir 40 along at least a substantial portion, and possibly the whole length, of the evaporation gap to the condensor 102, whereby even in sunless conditions liquid heat transfer fluid will occupy a substantial portion of the length of the evaporation gap 66, 67. As a result, when the sun does begin to shine, overheating of the plates is less likely.

During operation, the solar collector 10 operates much like a conventional collector disclosed by the referenced prior art, except that as heat transfer fluid is boiled from the evaporation gap 66,67, capillary action maintains the level liquid heat transfer fluid in the evaporation gap 66, 67 at a substantially constant level, whereby a large surface area per unit mass of liquid in the evaporation gap is exposed to the incident solar radiation.

Althought not shown, photovoltaic elements can be secured, for example by an adhesive, to the surface of the absorber 60. The photovoltaic elements serve to generate electrical energy directly from the components of the incident solar radiation lying outside the infrared region. The photovoltaic elements can be made transparent to infrared radiation and photoetched onto the plates of the absorber or indeed any surface of the collector which is suitable and available.

Referring now to FIGS. 6 to 9, different embodiments of an alternative aspect of the invention are shown.

FIG. 6 shows an alternative arrangement of tube 20 as shown in FIG. 1. The tube 20 is made of clear, extruded plastics material. Within the tube 20 is arranged an absorber 60, as described with reference to FIGS. 1 to 5. Alternatively other suitable absorbers as known in the prior art can be used. The tube 20 is made as a single extrusion which enables it to be produced in any desired shape, though it is shown here as a substantially elliptical shape. The tube 20 has a reflective layer 22 provided on one of its surfaces to reflect incident radiation back onto the absorber 60.

FIG. 7*a* shows a solar collector designated generally as 200 comprising a rigid frame 201 supporting a substantially parabolic, solar radiation concentrator 202 made of extruded plastics material coated with a reflective layer on its inner surface 203. An absorber 204 (which may be of the type having reference numeral 60 and described with reference to FIGS. 1 to 5) is arranged so that the solar radiation concentrator 202 reflects the incident solar radiation back on to the absorber 204 to an optimum degree. As shown in FIG. 7*b*, the frame 201 may be sealed with a cover 205, enabling the envelope thus created to be evacuated, as with envelope 18 referred to in the description of FIG. 1.

FIG. 8 shows an alternative form of a solar collector 200 wherein the solar radiation concentrator 202 comprises an upper part 206 and a lower part 206. The upper part 207 is of substantially parabolic cross-section and is coated with a reflective layer on its inner surface 203. The lower part 207 forms a housing for the absorber 204 and a conductive plate 208. The upper part 206 and the absorber 204 are arranged to maximise the reflection of incident solar radiation from the concentrator 202 onto the absorber 204. The absorber 204 absorbs the heat from the solar radiation and the conductive plate 208 transfers the heat energy away from the absorber 204 to enable the solar energy collected to be used.

Figure 9:
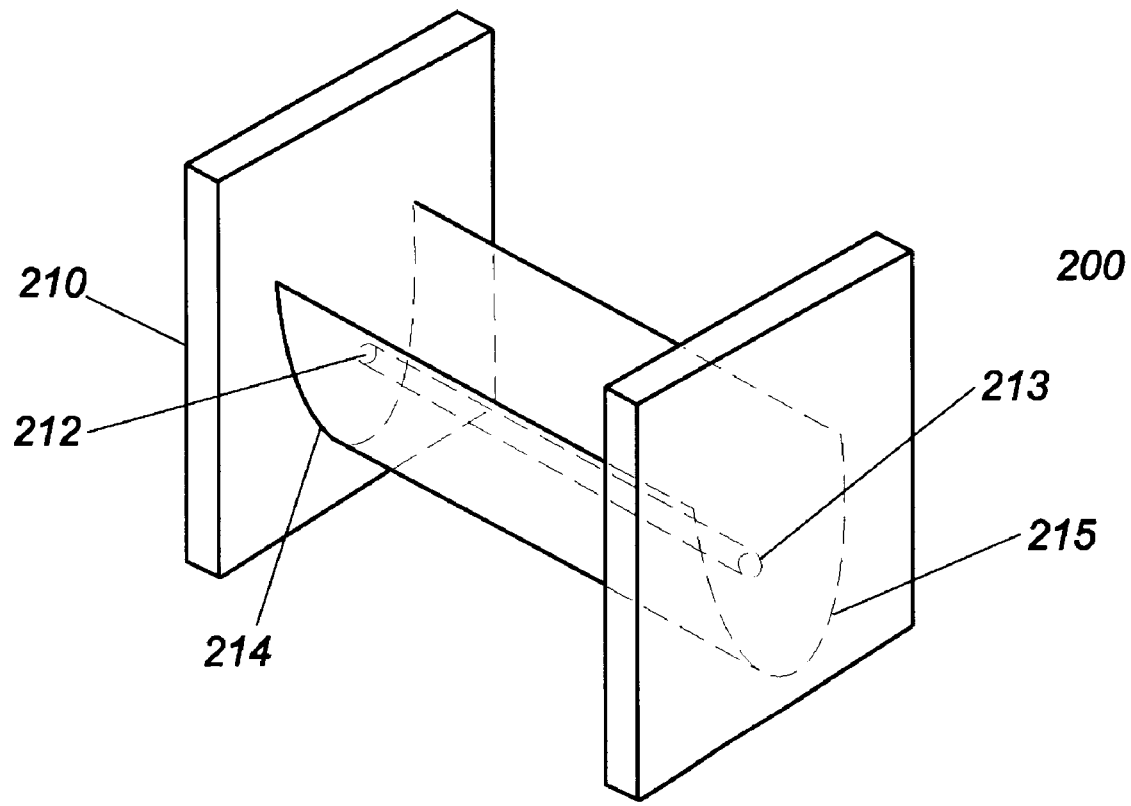
FIG. 9 shows a solar collector having two end plates and a parabolic reflector arranged therebetween.

FIG. 9 shows another form of a solar collector 200. Two end plates 210, 211 are arranged parallel to one another. Each end plate 210, 211 is formed with a hole 212, 213 and a substantially parabolic groove 214,215. A thin, flexible sheet 216 of material such as metal or plastic with a reflective coating is fitted into the grooves 214, 215 to form a solar radiation concentrator to reflect incident solar radiation onto an absorber 204 that is fitted between the holes 212, 213.

The arrangements shown in FIGS. 6 to 9 can take advantage of the use of moulded or extruded pieces. By having a solar concentrator that is formed to a desired shape and size a solar collector can be assembled that is highly efficient and effective without the need to rely on evacuated spaces in many arrangements.

I claim:

1. A solar collector (10) comprising:

an envelope defining a closed chamber and an absorber housed inside the evacuated envelope, the absorber comprising two plates which define a first evaporation gap in a first region of the absorber and a second evaporation gap in a second region of the absorber therebetween, said evaporation gaps providing communication between a reservoir of heat transfer fluid at a first end of the absorber and a condenser at a second end of the absorber, the plates being maintained in spaced relation to each other at a small distance X such that the arrangement of the plates defines the evaporation gaps therebetween and the distance X is such that capillary action between the plates can draw heat transfer fluid from the reservoir along at least a substantial portion of the evaporation gaps to the condenser, the absorber serving to transfer heat derived from incident solar radiation to heat transfer fluid contained in the evaporation gap, and the envelope having formations which serve as focusing lenses operative to direct solar radiation onto the second evaporation gaps, so that focused radiation causes heat transfer fluid in the second evaporation gap to become relatively hot, whereby localized evaporation of the fluid is condensed in the surrounding fluid and thermal energy is propagated toward a relatively cooler part of the absorber.

2. A solar collector according to claim 1, characterized in that the plates of the absorber also define a condensation channel providing communication between the reservoir and the condenser.

3. A solar collector according to claim 2, characterized in that the plates diverge from each other in at least one region and in each said region a plate runs parallel to one of the plates and is spaced therefrom by a distance X, thereby defining the second evaporation gap, and the condensation channel is defined by the plates and the parallel plate.

4. A solar collector according to claim 1, characterized in that the envelope comprises a panel provided with formations which serve as strengthening ribs.

5. A solar collector according to claim 4, wherein at least one of the strengthening ribs comprises a ridge that is tipped with insulating material and contacts at least one of said plates.

6. A solar collector according to claim 1, characterized in that the envelope has an external panel provided with external focusing ribs operative to direct solar radiation onto the plates inside the envelope.

7. A solar collector according to claim 1, characterized in that the envelope comprises a solar radiation concentrator operative to reflect solar radiation onto the absorber.

8. A solar collector according to claim 7, wherein the solar radiation concentrator is formed by molding or extrusion.

9. A solar collector according to claim 8, characterized in that the solar radiation concentrator is formed as a plurality of molded or extruded pieces.

10. A solar collector according to claim 8, wherein the solar radiation concentrator comprises a tube of extruded material.

11. A solar collector according to claim 8 characterized in that the solar radiation concentrator is formed as a single molding or extrusion.

12. A solar collector according to claim 7 characterized in that the solar radiation concentrator comprises a tube formed of clear plastics material and having a reflective layer provided on one surface to reflect incident solar radiation back onto the absorber.

13. A solar collector according to claim 7, characterized in that the solar radiation concentrator is preformed to reflect solar radiation onto the absorber to optimize the concentration of incident solar radiation back onto the absorber.

14. A solar collector according to claim 13 characterized in that the concentrator is formed of a reflective material, or a material having a reflective coating on one surface, and being preformed to a shape having a substantially parabolic cross-section, the concentrator being supported in a rigid frame, and the absorber arranged to receive maximized reflected solar radiation from the concentrator.

15. A solar collector (10) according to claim 14, characterized in that the frame can be sealed closed and the envelope so formed may be evacuated.

16. A solar collector according to claim 13 characterized in that the concentrator comprises an upper part of substantially parabolic cross-section and a lower part of substantially tubular form, the upper part forming a solar radiation reflector and the lower part forming a housing for the absorber and a conductive plate, the conductive plate being arranged to conduct heat energy away from the absorber.

17. A solar collector according to claim 13 characterized in that the collector comprises two end plates having a hole and a substantially parabolic groove formed therein, the concentrator comprises a sheet of thin, flexible, reflective material, or a material having a reflective coating on one surface, that is arranged with a first end of the sheet fitted in the groove on one of the end plates and a second end of the sheet fitted in the groove of the second end plate, and the absorber being arranged between the holes of the respective end plates.

18. A solar collector according to claim 13 comprising an absorber which comprises two plates which define an evaporation gap therebetween, said evaporation gap providing communication between a reservoir of heat transfer fluid at a first end of the absorber and a condenser at a second end of the absorber, the plates being maintained in spaced relation to each other at a small distance X such that the arrangement of the plates defines the evaporation gap therebetween and the distance X is such that capillary action between the plates can draw heat transfer fluid from the reservoir along at least a substantial portion of the evaporation gap to the condenser, the absorber serving to transfer heat derived from incident solar radiation to heat transfer fluid contained in the evaporation gap.

19. A solar collector comprising:

an envelope and an absorber housed inside the evacuated envelope, the absorber comprising a plurality of pairs of plates, each pair of plates defining therebetween a first evaporation gap in a first region of the absorber and a second evaporation gap in a second region of the absorber, said evaporation gaps providing communication between a reservoir of heat transfer fluid at a first end of the absorber and a condenser at a second end of the absorber, the plates being maintained in spaced relation to each other at a same distance X such that the arrangement of the plates defines the evaporation gaps therebetween and the distance X is such that capillary action between the plates can draw heat transfer fluid from the reservoir along at least a substantial portion of the evaporation gaps toward the condenser, the absorber serving to transfer heat derived from the incident solar radiation to heat transfer fluid contained in the evaporation gap, and the envelope having formations which serve as focusing lenses operative to direct solar radiation onto the second evaporation gap, so that focused radiation causes heat transfer fluid in the second evaporation gap to become relatively hot, whereby localized evaporation of the fluid is condensed in the surrounding fluid and thermal energy is propagated toward a relatively cooler part of the absorber.

* * * * *